United States Patent
Sugino

(10) Patent No.: US 9,464,919 B2
(45) Date of Patent: Oct. 11, 2016

(54) MAGNETIC POSITION DETECTING APPARATUS

(71) Applicant: Mitsubishi Electric Corporation, Tokyo (JP)

(72) Inventor: Takaki Sugino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/620,800

(22) Filed: Feb. 12, 2015

(65) Prior Publication Data

US 2016/0123772 A1 May 5, 2016

(30) Foreign Application Priority Data

Oct. 30, 2014 (JP) ................. 2014-221057

(51) Int. Cl.
*G01D 5/20* (2006.01)
*G01D 5/245* (2006.01)

(52) U.S. Cl.
CPC .............. *G01D 5/20* (2013.01); *G01D 5/245* (2013.01)

(58) Field of Classification Search
CPC ............................... G01D 5/20; G01D 5/245
USPC ................................................... 324/201.21
See application file for complete search history.

(56) References Cited

U.S. PATENT DOCUMENTS

| | | | |
|---|---|---|---|
| 4,558,365 A | 12/1985 | Ochi | |
| 5,442,865 A * | 8/1995 | Wallrafen | G01B 7/00 324/207.24 |
| 5,869,962 A * | 2/1999 | Kasumi | G01D 5/147 324/207.2 |
| 7,349,186 B2 * | 3/2008 | Ito | G11B 5/3906 324/207.21 |
| 2006/0202681 A1 | 9/2006 | Shoji | |
| 2012/0280677 A1 * | 11/2012 | Furukawa | G01D 5/147 324/207.11 |
| 2015/0253162 A1 * | 9/2015 | Kusumi | G01R 33/098 324/207.12 |
| 2015/0354987 A1 * | 12/2015 | Kusumi | G01D 5/145 324/207.21 |

FOREIGN PATENT DOCUMENTS

| | | |
|---|---|---|
| JP | 59-221617 A | 12/1984 |
| JP | 60-196619 A | 10/1985 |
| JP | 64-044816 A | 2/1989 |
| JP | 431231 B2 | 5/1992 |
| JP | 05-84444 B2 | 12/1993 |
| JP | 2006-250604 A | 9/2006 |
| JP | 2010-8161 A | 1/2010 |

OTHER PUBLICATIONS

Communication dated Aug. 18, 2015 from the Japanese Patent Office in counterpart application No. 2014-221057.
Communication dated Feb. 16, 2016, from the Japanese Patent Office in counterpart application No. 2014-221057.

* cited by examiner

*Primary Examiner* — Christ Mahoney
(74) *Attorney, Agent, or Firm* — Sughrue Mion, PLLC

(57) ABSTRACT

With magnetic poles of a magnetic scale each having a length in the moving direction of T, a magnetic field sensing part has m element lines (m≥2) each including n magnetic sensors (n≥2) as the magnetic sensors corresponding to one of the magnetic poles. The n magnetic sensors included in one of the element lines are arranged at a constant pitch of λ(λ=T/n). Each of the magnetic sensors included in the second or further element line is placed shifted by λ/m in the moving direction of the opposite magnetic pole from each of the magnetic sensors included in the previous element line.

6 Claims, 4 Drawing Sheets

MAGNETIC POSITION DETECTING APPARATUS

BACKGROUND OF THE INVENTION

1. Field of the Invention

The present invention relates to a magnetic position detecting apparatus using a magnetic sensor, and particularly relates to an arrangement of magnetic sensors suitable for small size and high accuracy.

2. Description of the Background Art

A magnetic position detecting apparatus includes: a magnetic field sensing part having a magnetic sensor the electric resistance of which varies depending on the magnetic field strength; and a magnetic scale that is alternately polarized to an N-pole and an S-pole, and detects a position change of the magnetic scale utilizing the fact that, when a relative movement occurs between the magnetic scale and the magnetic sensor, the magnetic field applied to the magnetic sensor changes.

For such a magnetic position detecting apparatus, the position detection accuracy may be improved by narrowing the polarization pitch of the magnetic scale, by placing a plurality of magnetic sensors on the magnetic field sensing part to increase the magnetic sensor arrangement density, by increasing the number of magnetic poles with the polarization pitch fixed, or the like.

For example, Patent Document 1 has proposed that two sensing parts each including four magnetic resistance elements arranged at a constant pitch are placed as a magnetic sensor that is separated from the magnetic scale by an air gap, then the position accuracy is improved by signal processing in a logic circuit.

Further, Patent Document 2 has proposed that, in a magnetic encoder in which a magnetic scale includes a multipole strug polarization part for high-resolution pulse generation and an index polarization part for position detection pulse generation provided thereon in two tracks, the index polarization part is shifted from the multipole strug polarization part by one-eighth of the polarization width of λ of one pair of N- and S-poles to improve the position detection accuracy.

[Patent Document 1] JP-A-64-44816
[Patent Document 2] JP-A-5-84444

However, for narrowing the polarization pitch, it is said that the practical lower limit of the polarization pitch is 100 μm using a current polarization technique. On the other hand, the method of increasing the magnetic sensor arrangement density on the magnetic field sensing part depends on the development progress of the micromachining technique for magnetic sensors. For the Patent Document 1, an area in which the plurality of magnetic sensors can be linearly arranged is limited by the magnetic pole length, so, in order to further improve the detection accuracy, a higher level of micromachining technique is needed.

Furthermore, the method of increasing the number of magnetic poles with the polarization pitch fixed requires increasing the diameter of the magnetic scale, which raises a problem of increasing the size of the apparatus. Also for the Patent Document 2, in order to further improve the detection accuracy, increasing the diameter of the magnetic scale to increase the number of magnetic poles is required. Thus, for the conventional methods, in order to improve the position detection accuracy of the magnetic position detecting apparatus, increasing the diameter of the magnetic scale or improving the micromachining technique is required, so it is difficult to improve the position detection accuracy and reducing the size of the apparatus at the same time.

SUMMARY OF THE INVENTION

In order to solve the above problem, it is an object of the present invention to provide a magnetic position detecting apparatus in which the position detection accuracy can be improved and the size of the apparatus can be reduced.

A magnetic position detecting apparatus in accordance with the invention includes: a magnetic scale in which N- and S-magnetic poles are alternately arranged, the magnetic scale being capable of rotational or linear movement; and a magnetic field sensing part having magnetic resistance elements the electric resistance of which varies depending on the magnetic field strength, the magnetic field sensing part being installed opposite to the magnetic scale with an air gap in between, the magnetic position detecting apparatus detecting a position change of the magnetic scale from a resistance change of the magnetic resistance elements, wherein, with the magnetic poles of the magnetic scale each having a length in the moving direction of T, the magnetic field sensing part has m element lines (m≥2) each including the n magnetic resistance elements (n≥2) as the magnetic resistance elements corresponding to one of the magnetic poles, the n magnetic resistance elements included in one of the element lines being arranged at a constant pitch of λ ($\lambda=T/n$), and wherein each of the magnetic resistance elements included in the second or further element line is placed shifted by a given distance in the moving direction of the opposite magnetic pole from each of the magnetic resistance elements included in the previous element line.

According to the magnetic position detecting apparatus in accordance with the invention, the arrangement density of the magnetic resistance elements within a limited arrangement area can be increased, and when the arrangement area of the magnetic resistance elements determined by the capacity of the magnetic field sensing part is at the same level as before, more magnetic resistance elements can be placed than before, thereby improving the position detection accuracy. On the other hand, when the required position resolution is at the same level as before, the capacity of the magnetic field sensing part can be smaller than before, which facilitates downsizing of the apparatus.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
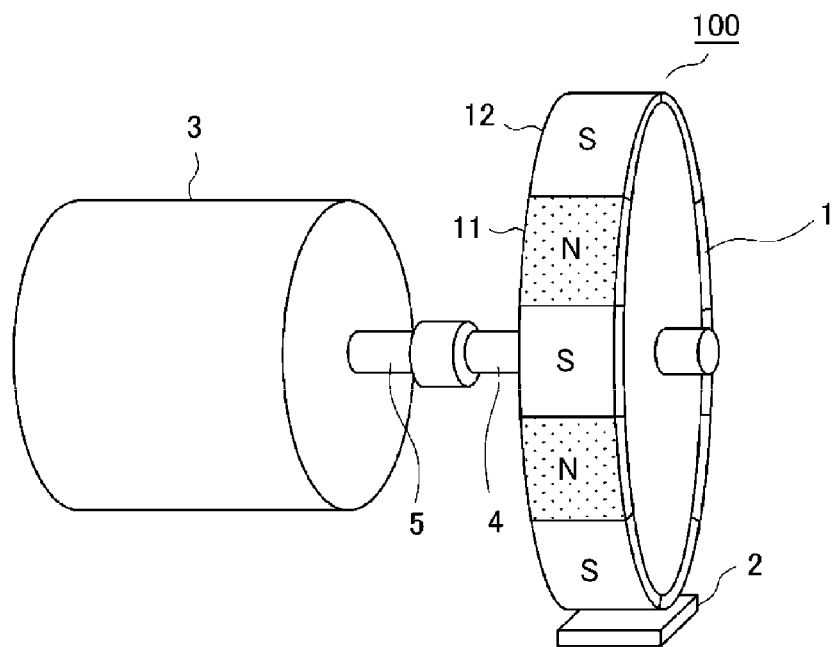
FIG. 1 is a perspective view showing a magnetic position detecting apparatus in accordance with a first embodiment of the invention.
Figure 2:
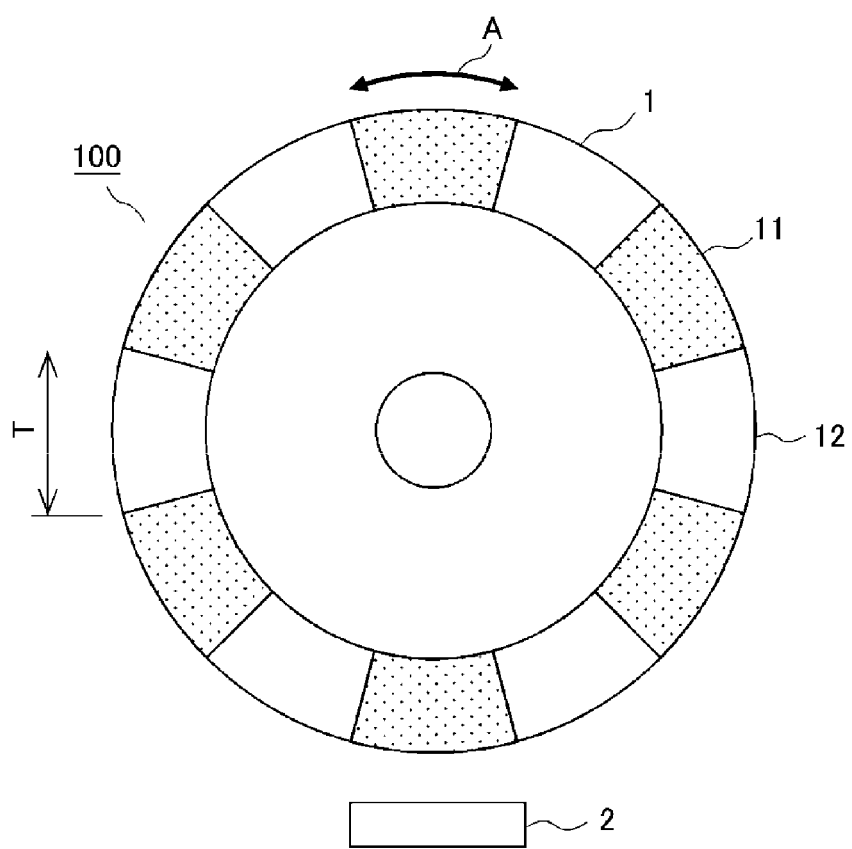
FIG. 2 is a plan view showing the magnetic position detecting apparatus in accordance with the first embodiment of the invention.
Figure 3:
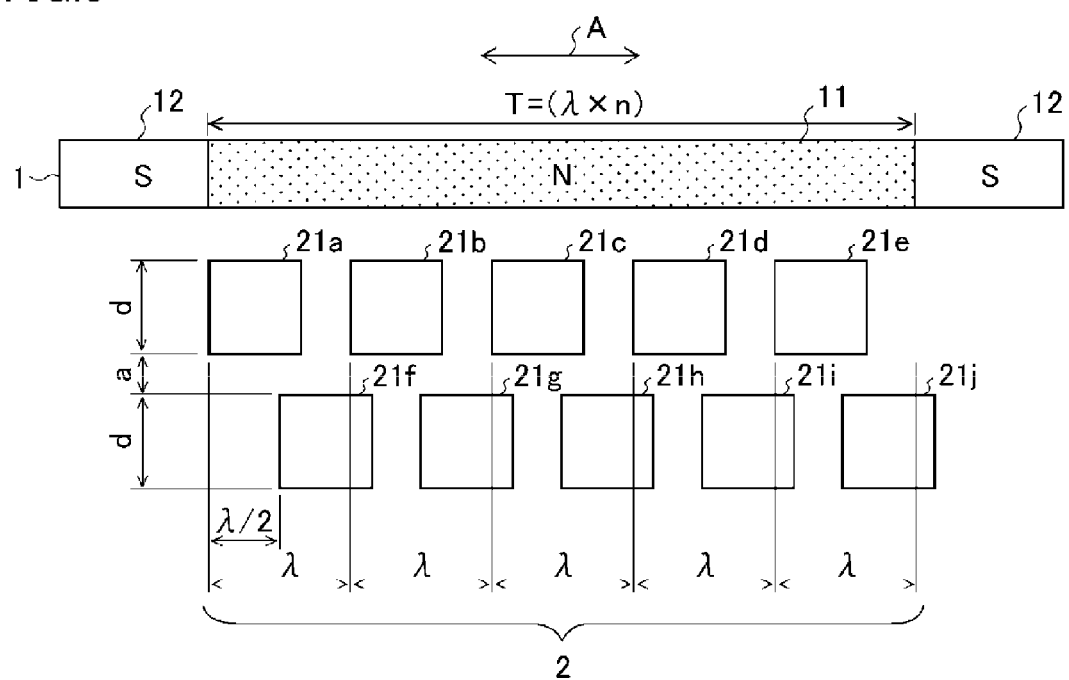
FIG. 3 shows an arrangement of magnetic sensors in the magnetic position detecting apparatus in accordance with the first embodiment of the invention.

A magnetic position detecting apparatus in accordance with a first embodiment of the invention is described below with reference to the drawings. FIGS. 1 and 2 are a perspective view and a plan view showing the magnetic position detecting apparatus in accordance with the first embodiment, respectively. FIG. 3 shows an arrangement of magnetic sensors in the magnetic position detecting apparatus in accordance with the first embodiment. Note that, through the drawings, the same or corresponding components are denoted by the same reference numerals.

A magnetic position detecting apparatus 100 in accordance with the first embodiment includes a magnetic scale 1 that is a rotating body and a magnetic field sensing part 2, and detects a position change of the magnetic scale 1 from a resistance change of a magnetic resistance element placed on the magnetic field sensing part 2. The magnetic scale 1 includes a magnetic pole polarized to N-pole 11 and a magnetic pole polarized to S-pole 12 that are alternately arranged in the moving direction (indicated by an arrow A in FIGS. 2 and 3). The magnetic poles 11, 12 have the same length in the moving direction (hereinafter referred to as magnetic pole length) that is denoted by T in the first embodiment.

The magnetic scale 1 is connected to a magnetic scale actuator 3 through a magnetic scale shaft 4 and a rotor shaft 5, and is rotatably installed opposite to the magnetic field sensing part 2 with an air gap in between. The magnetic scale actuator 3 is, for example, an electric motor.

The magnetic field sensing part 2 has magnetic sensors 21a-21j (collectively referred to as magnetic sensors 21) as a magnetic resistance element the electric resistance of which varies depending on the magnetic field strength. The magnetic sensors 21 used in the magnetic position detecting apparatus 100 are, for example, a Hall element, a GMR element utilizing Giant Magneto Resistance Effect, a TMR element utilizing Tunnel Magneto-Resistance Effect or the like.

The tunnel magneto-resistance effect is a phenomenon in which, in a structure of an insulator layer sandwiched by two magnetic metal layers, when a voltage is vertically applied to the film surfaces, a tunnel current flows in the insulator layer and a resistance change occurs. The TMR element utilizing this phenomenon can obtain a large output signal from the magnetic sensor even when a magnetic field strength from the magnetic scale 1 is weak.

The magnetic sensors 21 are formed by forming a film of magnetic material using a method, such as sputtering, on a supporting substrate, such as a silicon substrate, with an insulator film in between and etching in a predetermined pattern. For the Hall element, a NiFe film, a FeCo film or the like is used. For the GMR element, a spinvalve film that is a non-magnetic layer (Cu layer) sandwiched by two magnetic layers is used. For the TMR element, an MgO tunnel oxide film or the like is used.

A position detection method used by the magnetic position detecting apparatus 100 is briefly described. The magnetic scale 1 is rotated by the rotation of the rotor shaft 5 of the magnetic scale actuator 3 and moves relative to the magnetic sensors 21. The magnetic sensors 21, with a magnetic field applied thereto by the magnetic scale 1, detect a change in the magnetic field component (the strength and direction of the magnetic field) when a movement relative to the magnetic scale 1 occurs, and output a corresponding signal.

The signal output from the magnetic sensors 21 is converted to a waveform in a predetermined manner in a signal processing circuit (not shown). Based on this signal output waveform, the position of the magnetic scale 1 relative to the magnetic sensors 21 is detected, from which the position, shaft rotation speed and the like of the rotor shaft 5 are determined.

Next, the arrangement of the magnetic sensors 21 on the magnetic field sensing part 2 is described with reference to FIG. 3. As magnetic sensors 21 corresponding to one magnetic pole 11 of the magnetic scale 1, the magnetic field sensing part 2 has m element lines (m≥2) each including n magnetic sensors 21 (n≥2) arranged at a pitch of $\lambda$ in the moving direction (arrow A) of the magnetic pole 11 opposite thereto.

With n=5 and m=2 in the example shown in FIG. 3, the magnetic sensors 21 corresponding to the N-magnetic pole 11 include 10 magnetic sensors 21a-21j. The first line of magnetic sensors 21a-21e and the second line of magnetic sensors 21f-21j, are arranged at a pitch of $\lambda$ for each line, look like a two-dimensional array. Note that, though not shown, 10 magnetic sensors corresponding to the S-magnetic pole 12 are arranged adjacent to the 10 magnetic sensors 21 corresponding to the N-magnetic pole 11.

With the magnetic poles 11, 12 of the magnetic scale 1 each having a magnetic pole length of T, the pitch $\lambda$ is determined by the number n of the magnetic sensors 21 included per element line, that is, $\lambda = T/n$. Accordingly, in the example shown in FIG. 3, $\lambda = T/5$. Note that each of the magnetic sensors 21 included in the second element line is placed shifted by a given distance in the moving direction from each of the magnetic sensors 21 included in the first element line.

In the example shown in FIG. 3, each of the magnetic sensors 21f-21j in the second line is placed shifted by $\lambda/2$ in the moving direction from each of the magnetic sensors 21a-21e in the first line. Accordingly, the magnetic sensor 21f at the head of the second element line is placed shifted by $\lambda/2$ in the moving direction from the pattern edge of the magnetic sensor 21a at the head of the first element line.

Further, a space a is provided between the magnetic sensors 21a-21e in the first line and the magnetic sensors 21f-21j in the second line in the direction perpendicular to the moving direction. The magnetic sensors 21 shown in FIG. 3 have a side parallel to the substrate surface, the side having a shape (hereinafter referred to as a planar shape) of a square with a side length of d. As seen in this example, when the planar shape of the magnetic sensors 21 is a quadrilateral, a space needs to be provided in the direction perpendicular to the moving direction so that the element lines do not interfere with each other.

Note that, in the first embodiment, two element lines each including five magnetic sensors 21 are arranged, however, the number of magnetic sensors per line and the number of lines may be changed depending on the arrangement area determined by the required position resolution and the capacity of the magnetic field sensing part 2. Also in that case, each of the magnetic sensors 21 included in the second or further element line is placed shifted by a given distance in the moving direction of the opposite magnetic pole 11 from each of the magnetic sensors 21 included in the previous element line. This distance is not limited, and for example, may be λ/m. When three lines are arranged in an array, the shift distance in the moving direction may be λ/3.

Examples of the signal output waveforms of the magnetic sensors 21 of the magnetic position detecting apparatus 100 in accordance with the first embodiment are shown in FIG. 4. The output signal of each of the magnetic sensors 21 varies as the magnetic scale 1 rotates, providing 10 types of waveforms as shown in FIGS. 4. In FIGS. 4, the vertical axis indicates the output signal level of the magnetic sensors 21, and the horizontal axis indicates the relative elapsed time. FIG. 4A shows the signal output waveform of the magnetic sensor 21a. Similarly, FIG. 4B, FIG. 4C, FIG. 4D, FIG. 4E, FIG. 4F, FIG. 4G, FIG. 4H, FIG. 4I and FIG. 4J show the signal output waveforms of the magnetic sensors 21b-21j, respectively.

The output signals of the magnetic sensors 21a-21e included in the first element line are output each with a phase difference of the pitch of λ. Further, the output signals of the magnetic sensors 21f-21j included in the second element line are output each with a phase difference of λ/2 with respect to the output waveforms of the magnetic sensors 21a-21e. These sinusoidal signal pulse waves are processed as, for example, a binary data of Hi/Lo and output as an absolute position coordinate of the magnetic scale 1, by the signal processing circuit. Accordingly, the sinusoidal wave provides a resolution determining the position accuracy.

Note that, in the first embodiment, the magnetic scale 1 is a rotating body, but the relative movement mechanism may provide a linear movement. In the case of linear movement, the magnetic scale 1 is a linear moving body, and the arrangement of the magnetic sensors 21 of the magnetic field sensing part 2 may be configured similarly to FIG. 3.

According to the first embodiment, the magnetic sensors 21 corresponding to one magnetic pole 11 (or magnetic pole 12) have m element lines (m≥2) each including n magnetic sensors 21 (n≥2) arranged at a constant pitch of λ on a line parallel to the moving direction of the magnetic scale 1, in which each of the magnetic sensors 21 included in the second or further element line is placed shifted by a given distance in the moving direction of the magnetic scale 1 from each of the magnetic sensors 21 included in the previous element line, which can increase the arrangement density of the magnetic sensors 21 within a limited arrangement area.

Accordingly, when the arrangement area of the magnetic sensors 21 determined by the capacity of the magnetic field sensing part 2 is at the same level as before, more magnetic sensors 21 can be placed than before, thereby improving the position detection accuracy. On the other hand, when the required position resolution is at the same level as before, the capacity of the magnetic field sensing part 2 can be significantly smaller than before, which facilitates downsizing of the magnetic position detecting apparatus 100.

Further, with a TMR element used as the magnetic sensors 21, even when the magnetic field strength from the magnetic scale 1 is weak, a large signal output can be obtained from the magnetic sensors 21, allowing the space between the magnetic scale 1 and the magnetic sensors 21 to be reduced, which can facilitate further downsizing of the magnetic position detecting apparatus 100.

Second Embodiment

A magnetic position detecting apparatus 100 in accordance with a second embodiment of the invention has an overall configuration similar to that of the first embodiment, so it is described with reference to FIGS. 1 and 2 again and the description on the individual components is omitted herein. In the second embodiment, an example of magnetic sensors having a planar shape of a polygon is provided.

The arrangement of magnetic sensors on the magnetic field sensing part 2 of the magnetic position detecting apparatus 100 in accordance with the second embodiment is described with reference to FIG. 5. The magnetic field sensing part 2 has magnetic sensors 22a-22j (collectively referred to as magnetic sensors 22) as a magnetic resistance element the electric resistance of which varies depending on the magnetic field strength. The magnetic sensors 22 are, for example, a Hall element, a GMR element, a TMR element or the like.

As magnetic sensors 22 corresponding to one magnetic pole 11 of the magnetic scale 1, the magnetic field sensing part 2 has m element lines (m≥2) each including n magnetic sensors 22 (n≥2) arranged at a pitch of λ in the moving direction (arrow A) of the magnetic pole 11 opposite thereto. In the example shown in FIG. 5, n=5 and m=2. Note that, though not shown, 10 magnetic sensors corresponding to the S-magnetic pole 12 are arranged adjacent to the 10 magnetic sensors 22 corresponding to the N-magnetic pole 11.

With the magnetic poles 11, 12 of the magnetic scale 1 each having a magnetic pole length of T, the pitch λ is determined by the number n of the magnetic sensors 22 included per element line, that is, λ=T/n. Accordingly, in the example shown in FIG. 3, λ=T/5. Note that each of the magnetic sensors 22 included in the second or further element line is placed shifted by a given distance, for example, λ/m, in the moving direction of the magnetic pole 11 opposite thereto from each of the magnetic sensors 22 included in the previous element line. The above description is the same as that of the first embodiment.

In the second embodiment, the magnetic sensors 22 have a planar shape of an octagon. This allows a space for providing a metal wiring to connect the magnetic sensors 22 and a signal reading part to be easily secured on the substrate. Note that the wiring material is not specifically limited, but any material having a small electric resistance may be used.

Further, in the first embodiment, since the planar shape of the magnetic sensors 21 is a square, the space a needs to be provided in the direction perpendicular to the moving direction so that the element lines do not interfere with each other (see FIG. 3). However, the planar shape of the magnetic sensors 22 is a polygon, which may eliminate the need for providing such a space.

Figure 5:
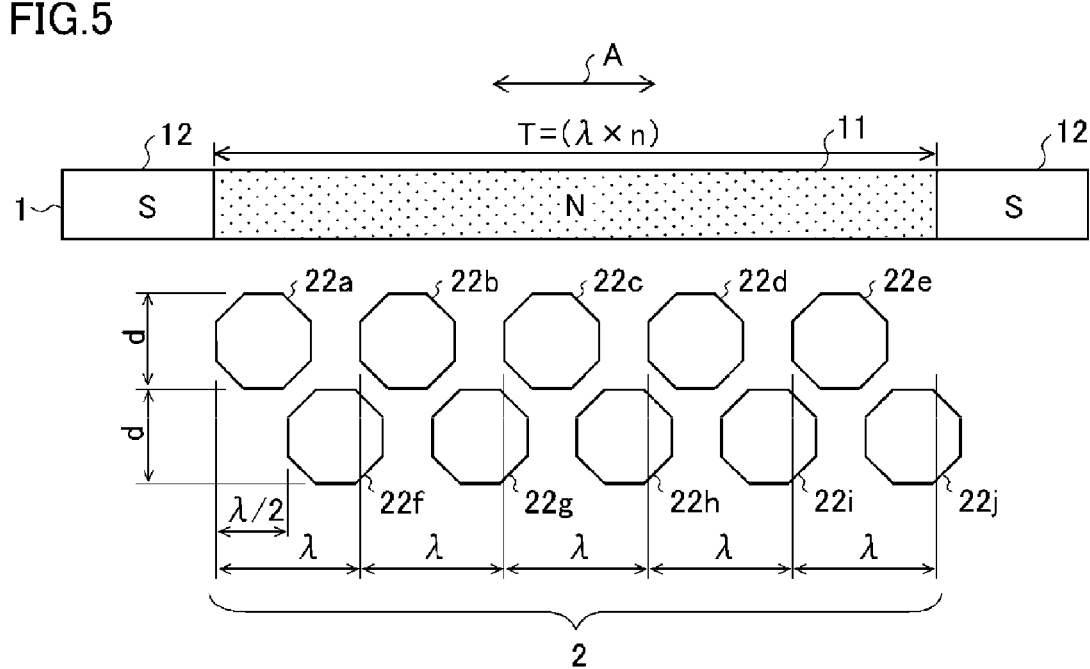
FIG. 5 shows an arrangement of magnetic sensors in a magnetic position detecting apparatus in accordance with a second embodiment of the invention.

In the example shown in FIG. 5, the bottom side of the octagon of the magnetic sensors 22a-22e of the first line and the top side of the octagon of the magnetic sensors 22f-22j of the second line are generally aligned with each other. Note that, unless the first element line and the second element line interfere with each other, the topside of the magnetic sensors 22f-22j of the second line may be placed at a higher position. This further increases the placement density of the magnetic sensors 22.

Note that the planar shape of the magnetic sensors 22 is not limited to the octagon, but various modifications are possible. The magnetic sensors 21 are patterned on the substrate as described in the first embodiment, so various planar shapes can easily be provided by changing a photomask.

Figure 4A:
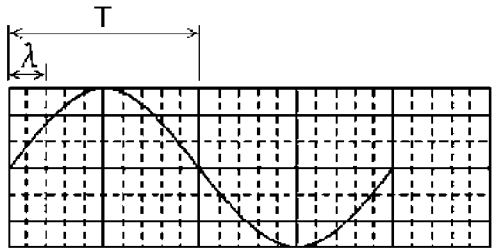
FIGS. 4A through 4J show signal output waveforms of the magnetic sensors in the magnetic position detecting apparatus in accordance with the first embodiment of the invention.
Figure 4F:
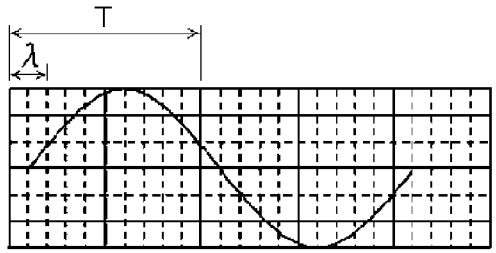
Figure 4B:
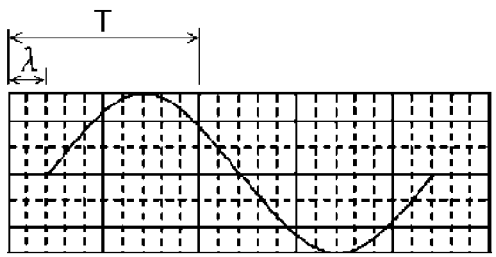
Figure 4G:
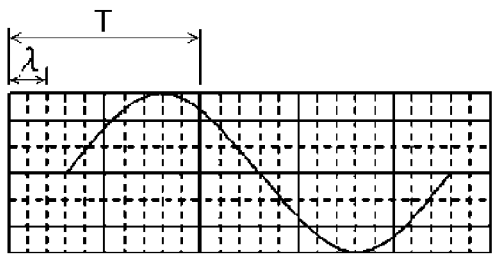
Figure 4C:
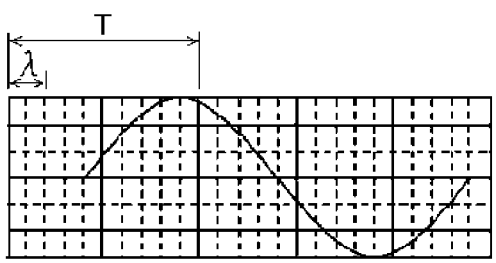
Figure 4H:
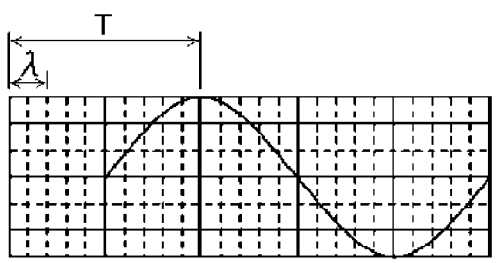
Figure 4D:
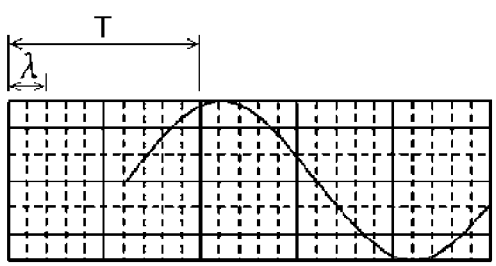
Figure 4I:
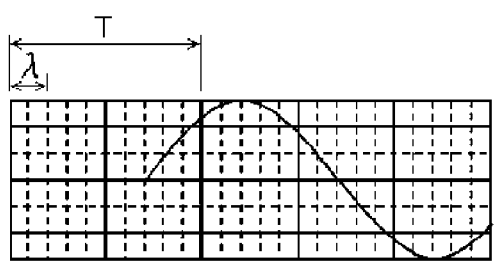
Figure 4E:
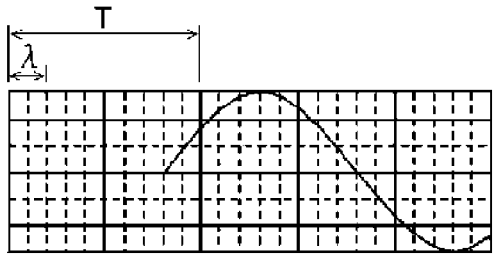
Figure 4J:
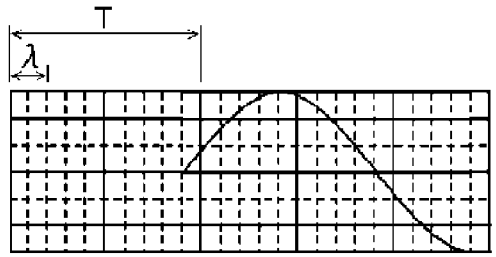

The signal output waveforms of the magnetic sensors 22 in the second embodiment are the same as those of the first embodiment, so the detail description is omitted herein. Also in the second embodiment, 10 types of waveforms as shown in FIGS. 4A to 4J are provided. FIG. 4A shows the signal output waveform of the magnetic sensor 22a. Similarly, FIG.

4B, FIG. 4C, FIG. 4D, FIG. 4E, FIG. 4F, FIG. 4G, FIG. 4H, FIG. 4I and FIG. 4J show the signal output waveforms of the magnetic sensors 22b-22j, respectively.

According to the second embodiment, in addition to the same advantage as that of the first embodiment, the planar shape of the magnetic sensors 22 is a polygon, which can further increase the arrangement density of the magnetic sensors 22, thereby improving the position detection accuracy. On the other hand, when the required position resolution is at the same level as before, the magnetic field sensing part 2 can be smaller than that of the first embodiment, which facilitates downsizing of the whole of the apparatus. Note that the embodiments of the invention may be freely combined or appropriately varied or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A magnetic position detecting apparatus comprising: a magnetic scale in which N- and S-magnetic poles are alternately arranged, the magnetic scale being capable of rotational or linear movement; and a magnetic field sensing part having magnetic resistance elements the electric resistance of which varies depending on the magnetic field strength, the magnetic field sensing part being installed opposite to the magnetic scale with an air gap in between, the magnetic position detecting apparatus detecting a position change of the magnetic scale from a resistance change of the magnetic resistance elements, wherein, with the magnetic poles of the magnetic scale each having a length in the moving direction of T, the magnetic field sensing part has m element lines (m≥2) each including the n magnetic resistance elements (n>2) as the magnetic resistance elements corresponding to one of the magnetic poles, the n magnetic resistance elements included in one of the element lines being arranged at a constant pitch of $\lambda(\lambda=T/n)$, and wherein each of the magnetic resistance elements included in the second or further element line is placed shifted by a given distance in the moving direction of the opposite magnetic pole from each of the magnetic resistance elements included in the previous element line.

2. The magnetic position detecting apparatus according to claim 1, wherein each of the magnetic resistance elements included in the second or further element line is placed shifted by $\lambda/m$ in the moving direction of the opposite magnetic pole from each of the magnetic resistance elements included in the previous element line.

3. The magnetic position detecting apparatus according to claim 1, wherein the magnetic resistance elements are provided on a substrate, having a side parallel to the substrate surface, the side having a shape of a polygon.

4. The magnetic position detecting apparatus according to claim 3, wherein the magnetic resistance elements having polygon shape are disposed on the substrate such that magnetic resistance elements included in a line have zero separation distance from magnetic resistance elements included in an adjacent line in a direction perpendicular to the moving direction of the opposite magnetic pole.

5. The magnetic position detecting apparatus according to claim 1, wherein the magnetic resistance elements are a magnetic resistance element utilizing Tunnel Magneto-Resistance Effect.

6. The magnetic position detecting apparatus according to claim 1, wherein the number of magnetic resistance elements n corresponding to one of the magnetic poles is five or greater.

* * * * *